Oct. 26, 1926.
L. D. CARTER
1,604,632
TIDE AND WAVE POWER GENERATOR
Filed Nov. 24, 1925   2 Sheets-Sheet 1
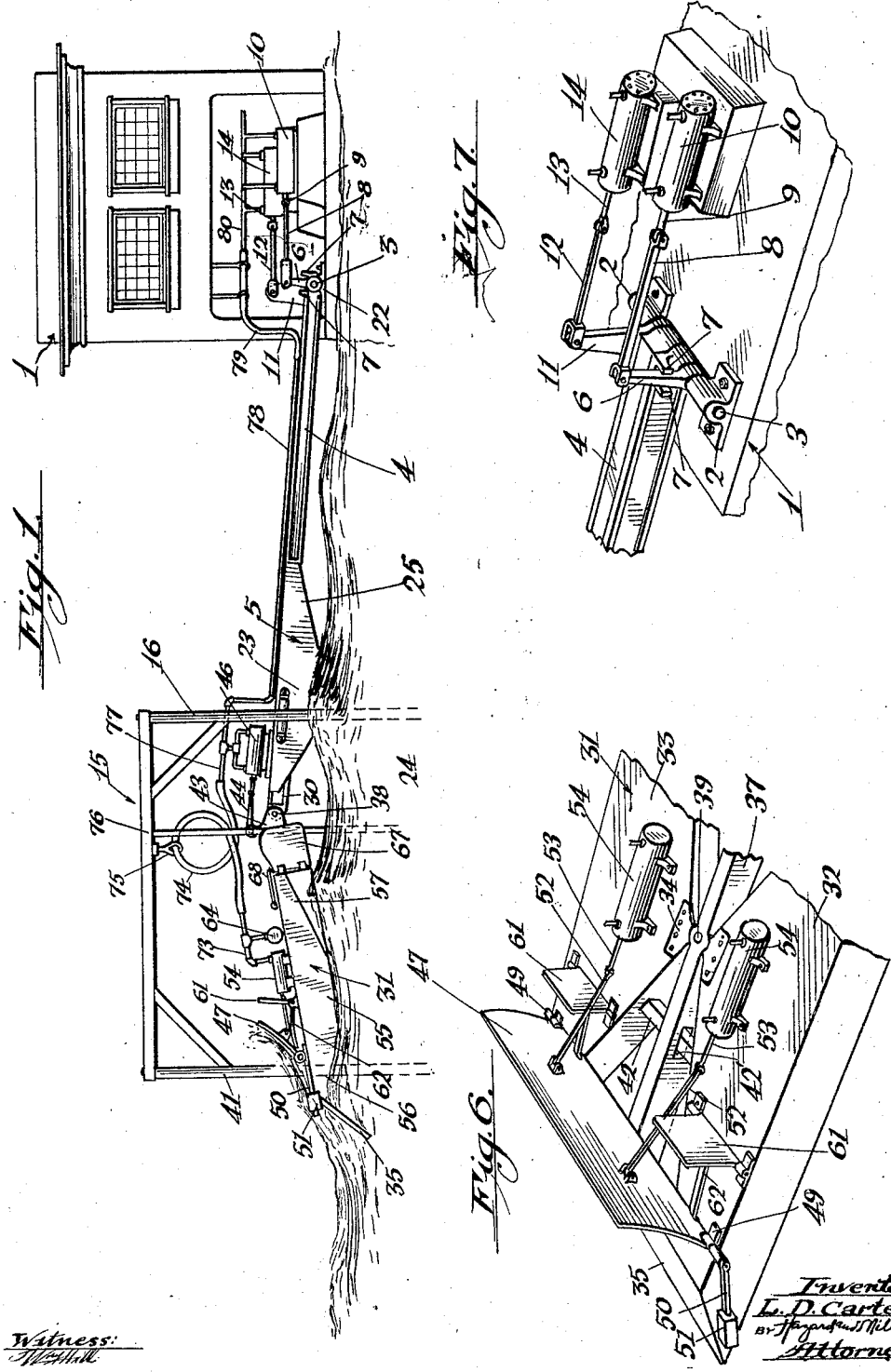

Oct. 26, 1926.
L. D. CARTER
1,604,632
TIDE AND WAVE POWER GENERATOR
Filed Nov. 24, 1925    2 Sheets-Sheet 2
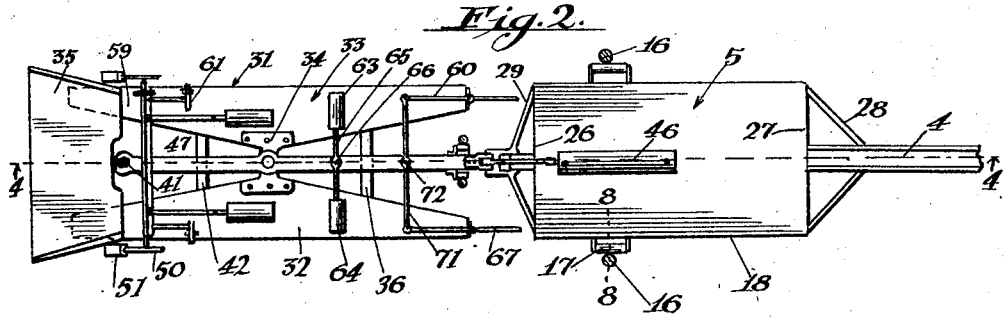
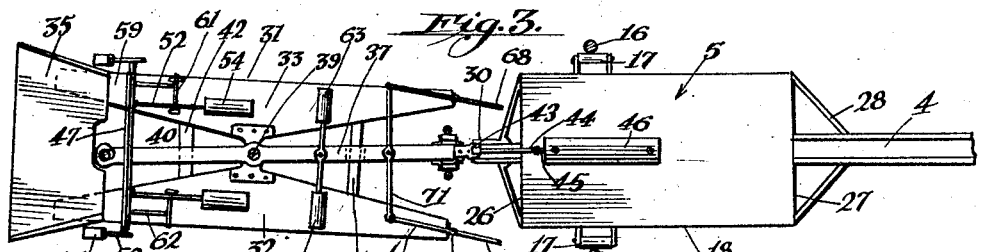
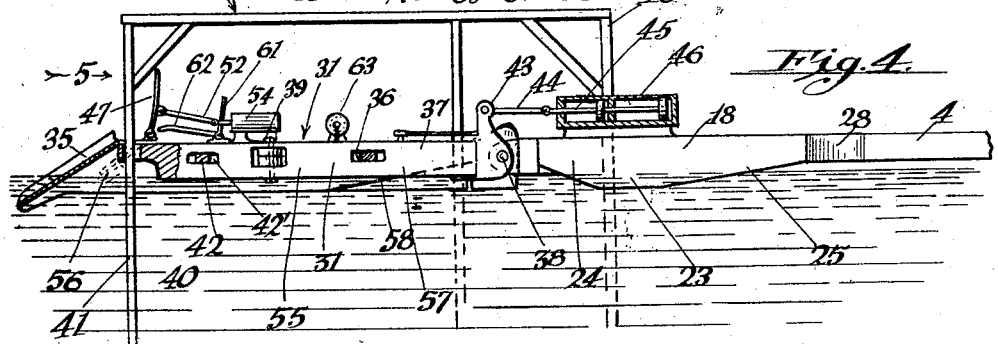
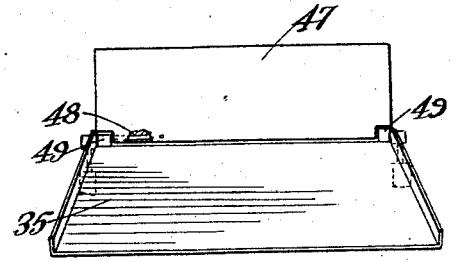
Inventor:
Llewellyn D. Carter
by Hazard and Miller
Attorneys Patented Oct. 26, 1926.

1,604,632

UNITED STATES PATENT OFFICE.

LLEWELLYN D. CARTER, OF LOS ANGELES, CALIFORNIA.

TIDE AND WAVE POWER GENERATOR.

Application filed November 24, 1925. Serial No. 71,105.

My invention is a tide and wave power generator, adapted to utilize the actions of waves to generate power which may be used locally and formed into other types of energy or transmitted to a distance.

An object of my invention is a tide and wave motor in which in one aspect or feature the motor is operated by the rise and fall of the tides and in another aspect is operated by the rise and fall of the waves by the power of impact of such waves and by the relative slope of different portions of the same wave or of different waves; these characteristics of tide and waves being adapted to generate power by compressing air, the compressed air being utilized to develop other forms of power or utilized in any desirable manner.

As to my tide power generator, I utilize a float which is connected to the shore or a fixed structure by a beam so that the float may rise and fall, having a pivotal connection with the fixed structure and in the rise and fall of the float the beam actuates an air compressing pump.

As to the wave power motor or generator, an object of my invention is to utilize connected floats whereby the different inclinations of these floats to one another due to their being buoyed or supported on different waves or on different parts of the same wave and the changing angle of such floats may be utilized to operate compressed air pumps.

A further feature of my invention is supporting a device positioned to receive the impact to utilize the kinetic energy of a wave to operate a compressed air pump.

A further object of my invention is to utilize the sidewise flowing or impact of waves which do not strike the device head on, to actuate air pumping motors.

In my invention as applied to wave motors I utilize in conjunction with the tide power float, one or more floats connected thereto and preferably extending seaward, these floats being linked one to the other and anchored in the seaward direction. The adjacent ends of connecting floats also are provided with an air pumping mechanism by which the relative angularity of the floats due to their being buoyed on different portions of the same wave or on different waves, and the changing angle of such floats one to the other, operate such compressed air devices.

As to my impact motor, I utilize an apron on the float furthest from shore or from the fixed support, this apron being adapted to engage oncoming waves and guide these waves against dash boards, the dash boards being mounted to yield due to the impact or kinetic energy of the wave and to compressed air in pumps in such action.

In regard to the feature of utilizing the lateral kinetic force of waves, one or more of the floats may be pivoted to a relatively rigid bar so that the float may swing or give sidewise due to impact of side waves and such lateral swing of the float actuating the compressed air pumps.

My invention will be more readily understood from the following description and drawings, in which;

Figure 1 is a side elevation of a plant for developing tide and wave power, indicating a shore station, a main tide and wave actuated float, and a single wave actuated float attached thereto, the single float having the impact operated machinery mounted thereon and also the pumps developing power from the lateral motion.

Fig. 2 is a plan view of the tide and the wave floats removed from the shore station.

Fig. 3 is a view similar to Fig. 2, indicating the action of the wave float when subjected to lateral displacement.

Fig. 4 is a longitudinal section taken on the line 4—4 of Fig. 2, in the direction of the arrows, indicating the position of the floats on calm water.

Fig. 5 is a front elevation in the direction of the arrow 5 of the wave float, omitting part of the stationary structure.

Fig. 6 is a perspective detail of part of the wave float, illustrating the mechanism for developing power by the impact of the waves.

Fig. 7 is a detail perspective showing part of the shore station and the manner of operation of compressed air pumps utilizing the tide and wave motion.

Fig. 8 is a detail on the line 8—8 of Fig. 2, illustrating the bearing of the tide operated float in relation to a fixed piling structure.

Referring particularly to the construction of the tide motor such as illustrated in Figs.

1, 2, 3, 4 and 7, a shore station is designated by the numeral 1 and is intended to house the means for using compressed air or for transforming this compressed air into another form of energy such as by electric generators driven by compressed air. This shore station can also house storage tanks for compressed air.

A pair of journal boxes 2 are secured in a fixed position in the shore station and carry a pin 3 on which is oscillatably mounted a substantial beam 4. A float 5 is rigidly connected to the outer end of this beam and is adapted to rise and fall with the tide and by individual wave action. A crank arm 6 is loosely mounted on the pin 3 and is engaged by lugs 7 on the beam 4 so that in changes of inclination of the beam due to the rise and fall of the tide relative to the shore station the crank is rocked. This action operates a connecting rod 8 which through the piston rod 9 operates a piston in a compressed air pump 10. The valve mechanism of this pump is not shown as it does not form a part of this immediate invention, it being understood that the air from such pump would be conveyed to storage tanks and hence would be utilized as desired. The pump is of the double acting type.

There is a lost motion between the arm 6 and the lugs 7 so that this arm will not be operated by the ordinary wave motion but will take up substantially a central position. It will thus be seen that when the tide rises and falls the inclination of the beam is changed thus operating the pump and storing up energy in the form of compressed air.

The action of the float 5 as a wave motor is substantially as follows:

A crank arm 11 is rigidly secured to the beam 4 at its inner end or this arm may be loosely mounted on the pin 3 and connected to the beam to rock therewith and a connecting rod 12 is attached to the piston 13 operating the compressed air pump 14. This pump is of the double acting type and would be connected to a suitable system of storage tanks.

The float 5 is maintained in proper position by utilizing a piling structure designated generally by the numeral 15, having lateral piles 16 which engage rollers or bumpers 17 extending outwardly from the sides 18 of these floats. As shown in Fig. 8, the rollers or bumpers are thrust outwardly by springs 19 mounted in cylinders 20 and thrusting against movable abutments 21 attached to rods 22. Thus the float will be kept substantially centrally centered between the lateral pile 16 under any action of the waves and thus maintain the beam 4 in proper alinement with the float mechanism.

The preferred construction of the float 5 is indicated particularly in Figs. 1 to 4 in which the float has a deep midship section as indicated by the numeral 23 and has substantially bow and stern inclined undersurfaces 24 and 25. The float is substantially rectangular in form, having straight sides as indicated by the numeral 18 and having a square bow and stern 26 and 27. The beam 4 is rigidly connected to the float by a framing 28 and a framing 29 extends forwardly from the bow and braces an extension beam 30 and the float is thus somewhat scow-shaped, the center buoyancy being slightly forward of the midship section but not a great deal forward thereof.

The action of this float 5 as the compressed air generator is substantially as follows:

The float has considerable buoyancy and therefore rises and falls on the crest and trough, thus oscillating through considerable changes of elevation and thereby rocking the beam 4 which through the crank 11 actuates the compressed air pump 14.

It will be noted that the bow and stern portions of the float have materially less buoyancy due to their shape than the midship section, therefore the float can drop deep into the trough of a wave and moreover the float will be elevated high on the crest of the wave as the midship section provides the greatest buoyant displacement. This particular construction utilizes the changes of elevation between the crest and trough of the waves substantially to its maximum extent. These under-water surfaces also re-act to the impact of the waves due to their flow under the float from seaward and the reflected and rebounding waves from the shore passing seaward.

The construction and action of the seaward floats are substantially as follows, being illustrated particularly in Figs. 1 to 4.

A seaward float 31 is preferably formed in two sections 32 and 33, somewhat in the form of a catamaran, these sections being secured together by a central plate 34 extending therebetween and by an apron 35 positioned across the bow of the two sections of the float. A brace 36 connects the stern end of the floats passing through a slot 36′ in the bar 37. This bar 37 is pivotally connected to the extension beam 30, projecting outwardly from the float 5 by means of a transverse pin 38, this forming a vertical hinge. The bar is secured to the plate 34 by a vertical bolt 39 and has an enlarged opening 40 through its outer end, adapted to slide up and down on an anchoring pile 41, this pile forming part of the piling structure 15.

A second brace 42 connects the bow sections of the float and passes through an elongated slot 42′ in the bar 37. Thus as the float tilts in a fore and aft direction in riding over waves as indicated in Fig. 1, the bar 37 also tilts and as the seaward float 31 and the landward float 5 ride on different waves or on different parts of the same wave, they will have continuously changing angles between the two floats. The pumping action due to this changing angles is by means of a strut 43 rigidly connected to the bar 37. This strut has a pivotally attached connecting rod 44, the latter operating a piston rod 45 having pistons in the cylinder 46, such cylinder being rigidly connected to the float 5. Thus when the landward and seaward floats change their relative fore and aft position due to riding on different waves or different portions of the same wave, the jack-knife action developed gives a reciprocating motion to the piston rod, hence actuating the air pump, this being a double acting pump. The particular valve construction is not shown as it does not form an immediate part of the present invention.

The use of impact of waves or their kinetic energy is substantially as follows, and illustrated particularly in Figs. 1 to 6.

As above mentioned the apron 35 is rigidly secured to the front of the float 31 and extends downwardly at an inclination into the water; preferably extending below the bottom of the float. The dash board 47 is mounted on a rock shaft 48 in journals 49 on the body of the float 31, immediately behind the apron, the rock shaft having a counter-weight arm 50 with a counter-weight 51 thereon. A pair of connecting rods 52 lead to piston rods 53 actuating pistons in the body of pump cylinders 54 and are of a double acting type.

The float 31 is constructed so that the midship section 55 has greater buoyancy than the bow section 56 or the stern section 57, this is due in part to the upward tapering of the underwater surface 58 of the stern sections and also to the narrowing horizontally of the bow and stern sections as indicated by the numerals 59 and 60 shown in Figs. 2 and 3.

The action of the impact mechanism is substantially as follows:

The bow of the float is inclined to dip into an approaching wave on account of its lack of buoyancy compared with the midship section and also on account of the apron extending downwardly into the water so that a large proportion of the oncoming wave rushes up the apron and strikes the dash board 47 as illustrated in Fig. 1, thereby forcing this back and actuating the pumps 54. After the wave has passed clear of the dash board 47, the counter-weights 51 through the arms 50 tend to restore it to its normal position as indicated in Figs. 4 and 6.

A secondary action in starting the return of the dash board is given by the auxiliary dash boards 61 pivoted to the forward end of each of the sections of the float 31 and having forwardly extending arms 62 so that when the breaking wave passes over the top of the dash board 47 it strikes the auxiliary dash boards 61, throwing these backwardly and swinging the arms 62 upwardly, these arms striking the back of the dash board 47, giving it an initial impulse restoring it to its normal position. Thus it will be seen that the wave motor re-acts to the impulse and utilizes the kinetic energy of a moving wave to operate the air compressors 54.

The manner of utilizing the impact or lateral flow of a wave striking the side of the float is substantially as follows, reference being had particularly to Figs. 2, 3 and 4.

It will be presumed that the outer float 31 is in the position as shown in Fig. 2, and a wave or the general direction of the waves is such that they strike on the right or starboard side of the float. This action swivels the float, moving both of the sections 32 and 33 into the position as shown in Fig. 3, with the float being thrown more or less in direct alinement with the oncoming waves. A pair of air compressors 63 and 64 are secured on the float sections 32 and 33 and have piston rods 65 connected to a central pin 66 secured to or extending upwardly from the bar 37. Thus when the floats swivel on the vertical bolt 39, the piston rods will work backwards and forwards in the pump cylinders and hence compress the air.

A steering mechanism is provided, having rudders 67 and 68 pivotally mounted on rudder stems 69 having tiller arms 70, these arms being pivotally connected to a cross bar 71, the latter being secured to a pivot pin 72 on the bar 37, thus when the stern of the float 31 is swung over in the position shown in Fig. 3, by the lateral force of a wave, the rudders are turned in the direction shown in such figure, to a greater degree. Therefore, due to the flow of water past the float, after the main body of the wave has spent its force, the stern of the float is swivelled back into the position shown in Fig. 2, the action being substantially the same as in steering a boat, in which the stern moves in the opposite direction to which the rudder is inclined from the stern of the boat. The float and steering arrangement are so arranged that it is immaterial whether the waves strike on the port or starboard side, the floats will swivel to operate the pumps above mentioned.

A system of piping for conducting the compressed air from the various pumps on the floats is indicated in Fig. 1, in which the compressors 54 and 63 lead to a manifold 73, this latter having a flexible pipe 74, the pipe being loosely mounted by a ring 75 from the top framing 76 of the piling structure 15.

The air from the cylinder 46 leads to a pipe 77 forming a continuation of the flexible pipe 74 and by means of a pipe 78 extending along the beam 4 and the flexible connection 79 leads by a pipe 80 in the land station to the air storage tanks, the air pumps 10 and 14 being likewise connected to the pipe 80.

In the illustration for purposes of simplicity, I have only shown one float extending seawardly from the float 5 which is connected to the shore or to the fixed station, however, it will be understood that if desired a series of such floats could extend outwardly in a seaward direction and be held in proper alinement one in relation to the other, so that the relative movement of the connecting floats in the jack-knife action in riding over the waves would develop power by compressing air.

It will also be understood that in certain circumstances, if not desired the impact device for utilizing breaking waves of the bow of the outside float may be discarded or this arrangement may be utilized on a stationary structure or on a float directly connected to a fixed shore station. Therefore in any locality where breaking waves may be utilized apparatus for receiving their impact against a dash board type of device, would be similar to my invention when operating a compressed air pump.

Although the piling structure I have shown is indicated as being disconnected from the shore, it will be understood that my power developing system may be installed between the piling of a long pier and thus utilize the piling structure of the pier as well as developing power from the waves flowing under and through the pier.

It will be noted that the floats have a greater cross sectional area at the midship section than at the bow and stern and therefore the midship section would have greater displacement. Hence when the floats ride over waves they will pitch to a considerable extent as the bow will plunge into waves and the stern will allow the floats to tilt when the waves support the midship section.

It will be noted that the dash board structure holds the two floats 31 and 32 in a relative fixed position so that they swivel as a unit on the vertical pivot bolt 39 as shown in Fig. 3. Direction is also brought to the anchoring device comprising the piling with an outer pile 41 which extends through an opening in the end of the bar 37; this being clearly illustrated in Figs. 2, 3 and 4.

It will also be noted that in the wave motion generator, utilizing the compressor 14, that it is not necessary that the compressor have a full stroke at each wave. This is manifestly impossible as some waves are higher than others. Moreover, it is immaterial as to whether the water level is at high or low tide or intermediate therebetween, as the wave motor will act in just the same manner, the pumping action being more towards one end of the compressor 14 in one case in low tide and more towards the back end of the compressor at high tide.

The pump 10 actuated by a tide power, it will be noted, is subject to the action of the lug 7 engaging the crank arm 6, there being a lost motion between the lug and the crank. Presuming that the sea is smooth and the device merely subject to tide action, on a rising tide the lug on the side of the beam 4 will press on the crank arm 6 until high tide is reached and on an ebb tide the lug 7 on the side adjacent the pump 10 will press on the crank arm 6, thus drawing the piston rod 9 outwardly. If there is a sea running and the tide is rising, the lug 7 on the outside will operate the crank to press the piston rod inwardly and on the recession of the wave there is sufficient space between the two lugs so that these do not function by ordinary wave action.

In a similar manner, on an ebb tide with a sea running the trough of the waves would force the lug 7 adjacent the pump, would press the crank 6 so as to draw the piston outwardly, and the wave action would be insufficient to bring both lugs into engagement with the crank 6 as the waves would not be as high as the rise and fall of the tide where such a structure is utilized.

It will be noted in regard to the action of the pumps 63 and 64 that the piston rods 65 are secured to a central pin 66 which extends upwardly from the bar 37. When the floats are in the position shown in Fig. 2, the piston rods are evenly positioned in the cylinders 63 and 64. However, when the floats are swivelled in the position of Fig. 3, the piston is thrust into the compressor 63 and drawn partly out of the compressor 64. This action operates the said compressors and when the floats swing in the opposite direction to that shown in Fig. 3, the action would be the reverse.

My invention may be materially changed in general construction and specific details to adapt it for different purposes, some of which have been indicated above and for different types of installations, such changes will be within the scope of my invention as set forth in the description, drawings and claims.

Having described my invention, what I claim is:

1. A wave power generator comprising in combination a float, a dash board pivotally mounted at its lower edge on the bow of the float to allow waves to flow thereover, an air compressor, a connection between the dash board and the air compressor, whereby a wave in swinging the dash board in one direction actuates the air compressor.

2. A wave power generator comprising in combination a float, a pivotally mounted dash board on one end of the float, the dash board being pivoted at its lower edge and when inactive normally occupying a substantially vertical position, an air compressor on the float, an operative connection between the dash board and the air compressor, whereby the dash board may swing downwardly when being struck by a wave and the wave flowing over the top of said dash board, thereby operating the compressor, and means to return the dash board to its normal position.

3. A wave power generator as claimed in claim 2 having in addition auxiliary dash boards positioned behind the first mentioned dash board to receive the impact of waves flowing over the said dash board and means connected with the auxiliary dash boards to apply a force to the said dash board to return it to its normal position.

4. A wave power generator comprising in combination a float, an apron at the bow end thereof, extending downwardly into the water, a pivotally mounted dash board attached at its lower edge on the float and normally occupying a substantially vertical position, an air compressor and an operative connection between the dash board and the compressor, the dash board being positioned to receive the impact of waves flowing up the apron and pivoting backwardly to allow waves to flow thereover.

5. A wave power generator as claimed in claim 4, having in addition auxiliary dash boards positioned behind the dash board to receive the impact of waves flowing thereover and means actuated by the auxiliary dash boards to give the dash board an impulse to return it to its normal position.

6. A wave power generator comprising in combination a longitudinal structure free to move in a vertical plane, a float pivotally connected thereto to swing on a vertical pivot, by a wave striking the float on one side and an air compressor operatively connected between the longitudinal structure and the float to be actuated by the side swinging movement of the float.

7. A wave power generator as claimed in claim 6, having in addition a rudder, means to actuate the rudder by the side swinging movement of the float under the impulse of a wave, the rudders being mounted to turn in a direction to side swing the float back to its normal position due to the flow of water past the rudder.

8. A wave power generator comprising in combination a longitudinal bar free to move in a vertical plane, a float formed in two sections, pivotally connected by a vertical pivot to said bar to allow swinging due to waves striking the float on the side, air compressors mounted on the float and an operative connection between the bar and the compressors to operate same by the swinging action of the float relative to the bar.

9. A wave power generator as claimed in claim 8 having in addition rudders connected to the stern end of each section of the float, tiller arms connected to the rudders, a connection between the tiller arms pivotally connected to the said bar, whereby the rudders are swung a greater amount than the float, said rudders acting to return the float to its normal position after the impact of a wave has passed.

10. In a wave power generator, a float having less displacement at the bow than at the midship section to allow the bow to readily pitch downwardly, a dash board pivotally mounted at its lower edge at the bow to allow waves to flow thereover and adapted to receive the impact of waves on the pitching of the float, and a power mechanism operated by the movement of the dash board.

11. In a wave power generator, a float having an apron at the bow extending downwardly below the normal water level and below the bottom of the float and at an inclination away from the float, a pivotally mounted dash board attached at its lower edge at the bow above the apron, normally when inactive occupying a substantially vertical position, and a power generating means operatively connected to the dash board to generate power on the swinging movement of the dash board.

In testimony whereof I have signed my name to this specification.

L. D. CARTER.